Oct. 13, 1953 L. H. CONNELL 2,655,561

APPARATUS FOR MAGNETIC RECORDING

Filed Aug. 9, 1948 3 Sheets-Sheet 1

INVENTOR.
LAWRENCE H. CONNELL
BY Whittemore, Hulbert & Belknap
ATTORNEYS

Oct. 13, 1953 L. H. CONNELL 2,655,561

APPARATUS FOR MAGNETIC RECORDING

Filed Aug. 9, 1948 3 Sheets-Sheet 2

INVENTOR.
LAWRENCE H. CONNELL
BY Whittemore, Hulbert & Belknap
ATTORNEYS

Oct. 13, 1953 L. H. CONNELL 2,655,561

APPARATUS FOR MAGNETIC RECORDING

Filed Aug. 9, 1948 3 Sheets-Sheet 3

INVENTOR.
LAWRENCE H. CONNELL
BY
Whittemore, Hulbert & Belknap
ATTORNEYS

Patented Oct. 13, 1953

2,655,561

UNITED STATES PATENT OFFICE 2,655,561

APPARATUS FOR MAGNETIC RECORDING

Lawrence H. Connell, Detroit, Mich.

Application August 9, 1948, Serial No. 43,288

5 Claims. (Cl. 179—100.2)

The present invention relates to sound recording and reproducing systems of the type in which an elongated record element, such as a wire or tape, formed of or provided with a permanent magnet material, has a sound recording imposed thereon as a result of variable magnetization. Equivalent results may be obtained when a disk or cylinder type record element is employed, and record elements of this type are included within the purview of this invention. In general, the record is made or reproduced by continuously advancing the record element across or through a gap between the spaced poles of an electromagnet. In recording, the magnetic field is caused to vary by varying the current in the windings of the magnet, and thus variably magnetizing the record element. Conversely, in reproduction, the variable magnetization of the record element induces a corresponding variable voltage in the windings.

In general, two types of recording and reproducing heads have been employed. In one, the poles of the magnet are disposed transversely of the record element. In the other, the poles are spaced longitudinally along the record element. For efficient results, the record element is in contact with the magnet poles, thus providing a closed magnetic path which permits a maximum magnetic flux to traverse the portion of the record element intermediate the poles.

The present invention is concerned more particularly with the system in which the magnet poles are spaced along the record element, herein referred to as axial recording, and has as its object the improved recording and reproduction of sound. More specifically, it is an object of the present invention to provide for recording with high fidelity over a broad range of audible frequencies, and particularly in the higher frequency audible range. It is a further object of the present invention to provide an improved recording head designed to record the higher audible frequencies with high fidelity. It is a further object of the present invention to accomplish the foregoing without increasing the speed of the record element above conventional practice. It is a further object of the present invention to provide for improved over-all performance of the system by improving the technique of erasing prior recordings from the record element, and minimizing the effect of stray magnetic fields.

Other objects and features of the invention will become apparent as the description proceeds, especially when taken in conjunction with the accompanying drawings, wherein.

The art of recording sound on record elements formed of permanent magnet material as a result of variably magnetizing the record element by subjecting it to a magnetic field varied in accordance with a sound modulated electric impulse is not broadly new. However, prior to the present invention, the fidelity of the reproduced recordings has not been satisfactory where quality has been important. For example, music recorded and reproduced by this medium was discordant, and inferior to results obtained by ordinary phonograph records.

In order to record sounds of various intensity at their correct proportional level, it is necessary to supplement the magnetizing force of the audible frequency voltage with a second biasing voltage. This bias voltage may be a supersonic bias, as for example 50,000 cycles per second, in which case the closed path for flux must have relatively large flux carrying capacity, since the bias current is preferably several times the maximum current induced by audible sound. The bias current may be a direct current bias, or it may be of a special type which I refer to as "additive magnetizing force." This is a new system in which the audio current to be recorded has added to it a magnetizing current of substantially uniform amount of the same polarity as the audio current.

The inferior quality of prior known magnetic recording was due in large part to two factors. In the first place, there is the mechanical problem of moving the record element past the head at an exactly constant speed. This problem is solved by apparatus disclosed in my prior copending applications Serial No. 727,424 and 738,439, filed February 8, 1947, and March 31, 1947, respectively.

The second factor is that, when supersonic bias is used, on a conventional recording head, a moderately high audio frequency is recorded with both frequency and amplitude distortion. Furthermore, the very high audio frequencies do not record at all, or at so low a level as to be incapable of satisfactory reproduction.

Similar failure to obtain faithful recording of the higher audible frequencies was noted when other types of bias were employed, although for somewhat different reasons.

Before referring to the specific improvements which I have made in the art of magnetic recording, it is desirable to describe the changes in flux distribution when the magnet pole faces in contact with the record element are excessively wide.

Figures 1, 2, 3, 4, 5, 6:
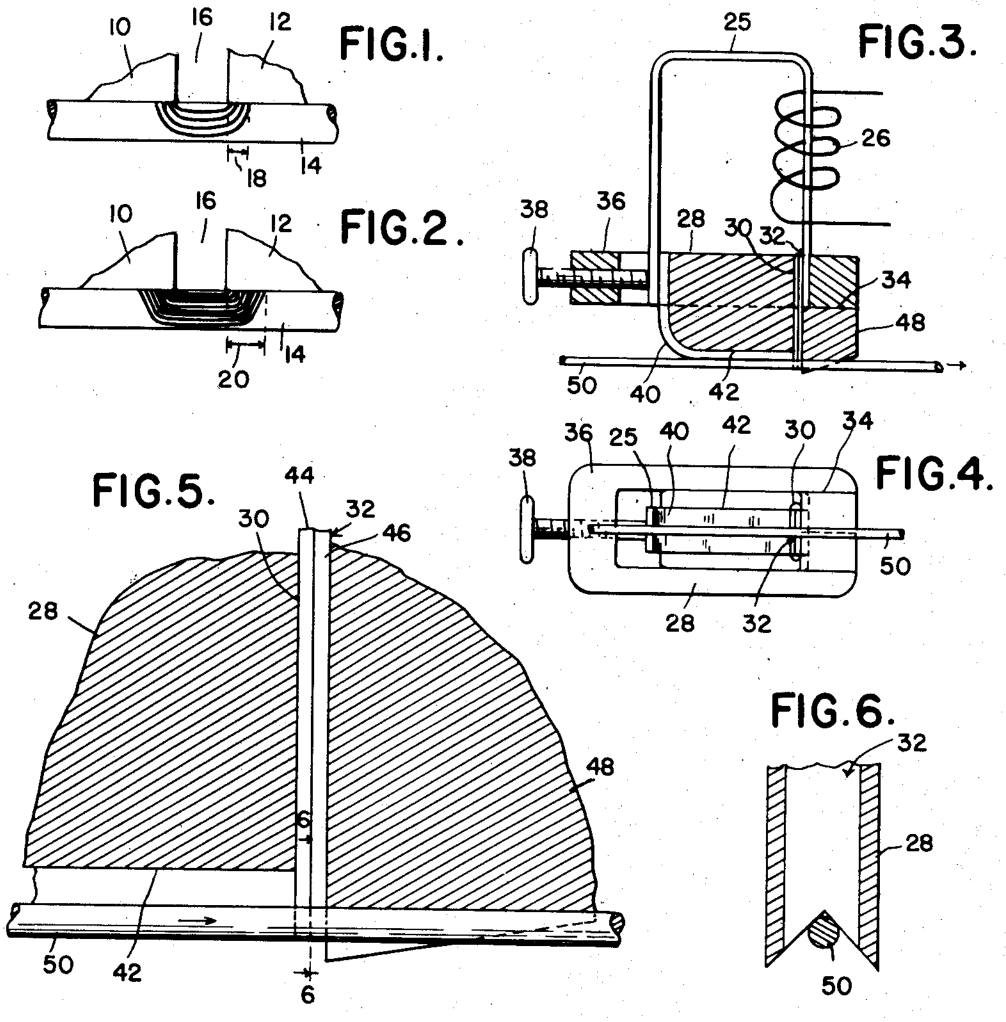
Figure 1 is a diagrammatic view illustrating flux distribution in a record element in contact with relatively wide poles when a relatively small magnetizing force is present.
Figure 2 is very similar to Figure 1 illustrating flux distribution when the magnetizing force is relatively greater.
Figure 3 is a longitudinal section through a recording head constructed in accordance with the present invention.
Figure 4 is a bottom plan view of the recording head shown in Figure 4.
Figure 5 is an enlarged fragmentary transverse longitudinal section illustrating the construction of the recording head at the point of contact with the record element.
Figure 6 is a fragmentary section on the line 6—6 of Figure 5.

In Figures 1 and 2 there are shown two poles 10, 12 of a magnetic recording head. These poles are part of an electromagnet, and suitable windings are provided which vary the magnetic field in accordance with sound to be recorded. A record element 14, here illustrated as a wire, but which may be a tape or other element, is advanced past the head in contact with the poles 10, 12. The poles are shown as having a relatively great dimension in contact with the record element. In Figure 1 a condition which results from a relatively weak magnetic field is illustrated. Here the lines of force are concentrated adjacent the gap 16, and the effective width of the departing pole 12 is indicated at 18. In Figure 2 a stronger field is assumed, and the lines of force are shown as having spread out so that the effective pole width of the departing pole 12 is as indicated at 20. It will be apparent that this spreading out of the lines of flux also results in an increase in the effective gap width. It will be appreciated that these conditions may take place during a single vibration of a sound to be recorded, or many times during a single sound vibration if supersonic bias is used.

It was previously supposed that, in recording with supersonic bias, the gap width between the poles of the recording head was critical. This supposition is erroneous, and when the present invention is practiced, the width of gap may be as great or as small as desired, so long as flux leakage around the record element is not excessive.

It is now found that when recording with supersonic bias, the width of the departing pole in contact with the record element is the important factor. This discovery was made as a result of employing flat pole surfaces in tangential contact with a record element disposed around a circular drum or capstan, as disclosed in my prior copending application Serial No. 738,439, filed March 31, 1947. This arrangement results in the departing pole having theoretical point contact with a wire record element, which in practice widens out as a result of wear to a limited zone or area of contact. It was observed that in the higher register of audible sounds, a reproduction representing a many fold improvement was obtained.

A proper supersonic bias is selected to have a magnetizing force which exceeds the coercive force of the portion of the record element in the magnetic field by a predetermined substantial amount. Thus for example, a bias current of about 5.5 ma. (R. M. S.) is suitable when the maximum audio current is about 1.2 ma. (R. M. S.). The bias current is thus seen to be large compared to the audio current. A useful design concept is that the effect of the supersonic bias current is to reduce the width of the hysteresis loop of the record element to zero. When this is the case, the record left on the wire is determined entirely by the magnetizing force present on the departing edge of the departing pole. The fact that a point on the record element may have been repeatedly and oppositely magnetized and demagnetized while traversing the magnetic field can thus be made of no significance. It also follows that in this type of recording, using a relatively high intensity supersonic bias, gap width is of no significance.

These considerations however make it of the utmost importance that the flux density at the departing edge of the departing pole be substantially the same as that at the entering edge of this pole; or in other words, that flux density across the departing pole be of substantial uniformity. This is true for two reasons. In the first place, the level at which the record is left is determined by the flux density at the departing edge of the departing pole. In the second place, the effective departing edge of the departing pole must not shift longitudinally of the record element with changes in flux, as this would produce an undesirable frequency distortion.

Both of these requirements are met by reducing the width of the departing pole face in contact with the record element as measured longitudinally of the record element. Since magnetization of the record element is effected only when the instantaneous value of bias current is high, i. e., well above the coercive force of the portion of the record element in the magnetizing field, the flux density across a narrow pole may at this time be substantially uniform, or at least there is substantial flux at the departing edge of the departing pole.

If input during recording is plotted against output during reproduction, it is found that saturation occurs at a level dependent on the pole width. Evidently, saturation occurs at the transfer area between pole and wire. This consideration of course limits the minimum width of the departing pole. The practical design therefore is to reduce the width of pole until there is evidence of some saturation at high intensity levels. This results in reasonably uniform flux distribution across the pole contact area at any instantaneous bias level capable of leaving a record, since high audio frequency can be recorded and reproduced with no perceptible amplitude or frequency modulation.

While the foregoing method of recording using a supersonic bias of relatively high intensity represents a considerable advance over prior known methods, it is subject to some defects. Therefore, a method of using a direct current bias or an additive magnetizing force has been developed. In this last method the value of the direct current bias or additive magnetizing force is much smaller than the supersonic bias. Where a supersonic bias having a value several times the audio current is employed, in this latter method, the direct current bias or additive magnetizing force may be only a fraction (as for example, one-third) of the audio current.

In this method it is impossible successfully to magnetize-demagnetize-remagnetize the record element, as may occur with supersonic bias. Accordingly, it is desirable to employ a narrow gap magnet. For reasons which are apparent from the description of Figures 1 and 2, this requires the use of two narrow pole faces contacting the record element to avoid widening out of the effective gap when flux density is high. The poles should be as narrow as possible and still carry the requisite maximum flux through the transfer areas from poles to record element. Since the direct current bias or the additive magnetizing force represents a much smaller value relative to audio current than is the case for supersonic bias, the width of pole in contact with the record element may be correspondingly less and still have adequate flux carrying capacity. The effective gap should be of substantially constant width, and its effective width should be substantially less than the length of record element on which a full wave of the highest audible frequency is recorded.

In both types of recording, the pole width is selected such that the effective departing edge of the departing pole remains fixed and a substantial amount of flux is present whenever the magnetic recording field is strong enough to produce a permanent magnetic record.

If the departing pole has an effective width equal to the length of record element on which a full cycle of the highest audio frequency to be recorded is impressed, it will be obvious that the flux at the departing edge of the departing pole will be in opposition to the magnetization imparted to the departing portion of the record element as it passed the entering edge of the departing pole. If hysteresis effect is not eliminated, this will result in distortion. This condition may be expressed as a pole width of $s/f$ where $s$ is the speed of advance of the record element in inches per second and $f$ is the frequency of the audible sound to be recorded. To reduce this effect, it is necessary that the pole width be substantially less than $s/f$.

In either type of recording, movement of the effective departing edge of the departing pole is very undesirable and results in distortion. In general terms it may be stated that the departing pole should be of such width or construction as to prevent movement of its effective departing edge longitudinally of the record element by an amount sufficient to effect a frequency variation which will produce audible discords.

The lower limit in both methods of recording for the width of the departing pole in contact with the record element is determined by two factors. The first of these is flux transfer. Obviously the flux path between the pole and record element must include a contact area large enough to avoid saturation at intensities below the maximum to be recorded, and large enough to permit passage of sufficient flux to efficiently magnetize the record element. The material of the pole is therefore selected to have the highest possible permeability consistent with high saturation. In the second place, the pole width should not be so small as to present practical difficulties in its production. Obviously the kind of record element employed, the contact area between the record element and the departing pole face, and the magnetic properties of the material from which the contacting pole face is made will enter into the selection of the pole width. The exact width of the pole may be determined by experiment.

Very satisfactory results have been obtained where the width of the departing pole is .002 inch. High fidelity recording of music, with good reproduction up to 6000 cycles per second were obtained when recording on a non-magnetic wire .004 inch in diameter provided with a plating having a thickness of .0003 inch of a nickel-cobalt alloy.

Best results have been obtained using a high frequency bias for example 50,000 cycles per second in conjunction with an audio current of substantially less strength. The high frequency bias current is preferably of a value such that its peak magnetizing effect is substantially greater than the coercive force of that portion of the record element intermediate the poles. The width of the departing pole face measured longitudinally of the record element which is in contact with the record element is selected in accordance with the magnetic properties thereof such that for all values of total magnetizing force which are sufficiently greater than the coercive force of the portion of the record element between the poles to produce effective recording, the flux distribution across the transverse area between the departing pole and record element is substantially uniform. As a result of this arrangement each portion of the record element, as it leaves the influence of the departing pole face is at a degree of magnetization corresponding precisely to the impressed magnetizing force. It is recognized that the record element which remains in contact with the pole face and in fact that portion of the record element intermediate the departing and approaching pole faces will be magnetized in the same direction and to the same amount. However, the important consideration is the degree of magnetization of the record element as it leaves the influence of the departing pole face. Both the high frequency bias current and the audio modulated current are alternating currents and reverse their directions. Therefore as the magnetizing current passes through zero the flux density across the departing pole face in contact with the record element may not be uniform. However, at this time the magnetizing force is less than the coercive force of the portion of the record element intermediate the poles so that this non-uniform flux distribution has no effect in magnetizing the wire. The important thing is that when the magnetizing force is sufficiently great to exceed the coercive force of the portion of the record element intermediate the portion, or in other words when the magnetic field is strong enough to effect magnetization of the record element, the flux density across the transverse area between the departing pole and the record element shall be substantially uniform. If this condition is realized high fidelity recording of any audio frequency is obtained.

As stated previously, the width of the approaching pole in contact with the record element, and the gap are not critical in the type of recording where a high frequency, supersonic bias current is employed. However, for other methods of recording, it may be desirable to exercise a close control on the effective gap width, in which case both the approaching and departing pole width may be strictly limited.

Referring now to Figures 3-6, there is illustrated a magnetic recording head intended for use with a high frequency, supersonic bias current. The electro magnet comprises a main core 25 of generally U-shape, having windings indicated at 26. A support body 28, which may be formed of a suitable plastic, is provided with a transverse slot 30 for receiving the departing pole piece 32. The body 28 is shouldered as seen at 34 to receive a clamping member 36 having a clamping screw 38.

The approaching pole piece 40, which is desirably formed of a high permeability material, such as Mumetal, is shaped to lie along the bottom surface 42 of the body, and has an end curved to lie under the screw 38. The departing pole piece 32 may take the form of a bimetal strip, one strip 44 for example being copper or aluminum and the other strip 46 being pure electrolytic iron, silicon steel, or the like, preferably plated to the strip 44. This permits very accurate control of the thickness of the magnetic strip 46.

The portion 48 of the body 28 which lies beyond the slot 30 serves as a support for the projecting end of the departing pole piece. In order to provide increased area of contact between the departing pole piece and the record element, the end of the pole piece 32 is notched, and the supporting part 48 of the block 28 is correspondingly notched.

With the parts assembled as seen in Figure 3, the pole pieces 32 and 40 are held in firm contact with the ends of the magnet core and a good path for flux is provided.

Attention is directed to the fact that flux leakage across the gap is minimized by the arrangement of pole pieces. These pieces comprise essentially flat strips. disposed perpendicular to each other with their end edges parallel, and a side surface of one strip in alignment with the end surface of the other strip. This provides a maximum area of contact between a wire 50 and the approaching pole piece 40, and an accurately predetermined width of departing pole in contact with the wire. The body 28 and associated parts may be removed from the magnet core and replaced as a unit when the pole piece 32 becomes worn, or if preferred, the pole piece 32 may be adjustable in the slot 30 and moved outwardly as it wears.

By way of specific example, a recording head has been made and tested having the following specifications. The magnet core 25 was formed of a strip of Mumetal $\frac{3}{16}$ inches wide and .014 inch thick. The winding 26 was 2000 turns of #40 enamel copper wire. The approaching pole piece was formed of a strip of Mumetal $\frac{3}{16}$ by .014 inch. The departing pole was a strip $\frac{3}{16}$ wide of oriented silicon steel supported by a non-magnetic strip, such as Phosphor bronze. This head was used to record music on a wire as described above at a wire speed of about 20 inches per second, using a high frequency bias of 50,000 cycles per second, at a current of about 6 milliamps, the maximum audio current swings being about 1.2 milliamps (both values R. M. C.).

Figure 7:
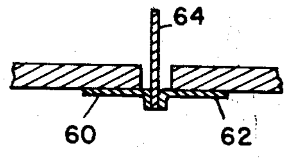
Figure 7 is a longitudinal fragmentary section through a modified recording head.

Another form of recording head is illustrated in Figure 7. In this case the approaching pole 60 and the departing pole 62 are separated by a non-magnetic material such as the copper strip 64, and the pole pieces are turned away from the strip 64 to minimize flux leakage across the gap. This type of head is designed for recording with direct current bias or additive magnetizing force, and will maintain the effective gap substantially uniform in width even though flux may vary considerably. Since in this method of recording, total flux will be substantially less than when supersonic bias is used, narrower pole faces in contact with the record element may be employed to achieve a given level of recording. If a tape record element is employed thus increasing area of contact, pole width may be reduced very substantially.

The quality of reproduction obtained when the present system is employed is so high that it is desirable to eliminate sources of noise which in prior systems have not been particularly objectionable. The record elements which are employed in this type of recording are capable of being used over and over again, provided that a previous recording is erased prior to each use. The best method of erasing a previous recording is to subject the record element to heat. In the case of a stainless steel wire this wire should be heated to a dull red color which corresponds to the Currie point of the wire.

Figure 8:
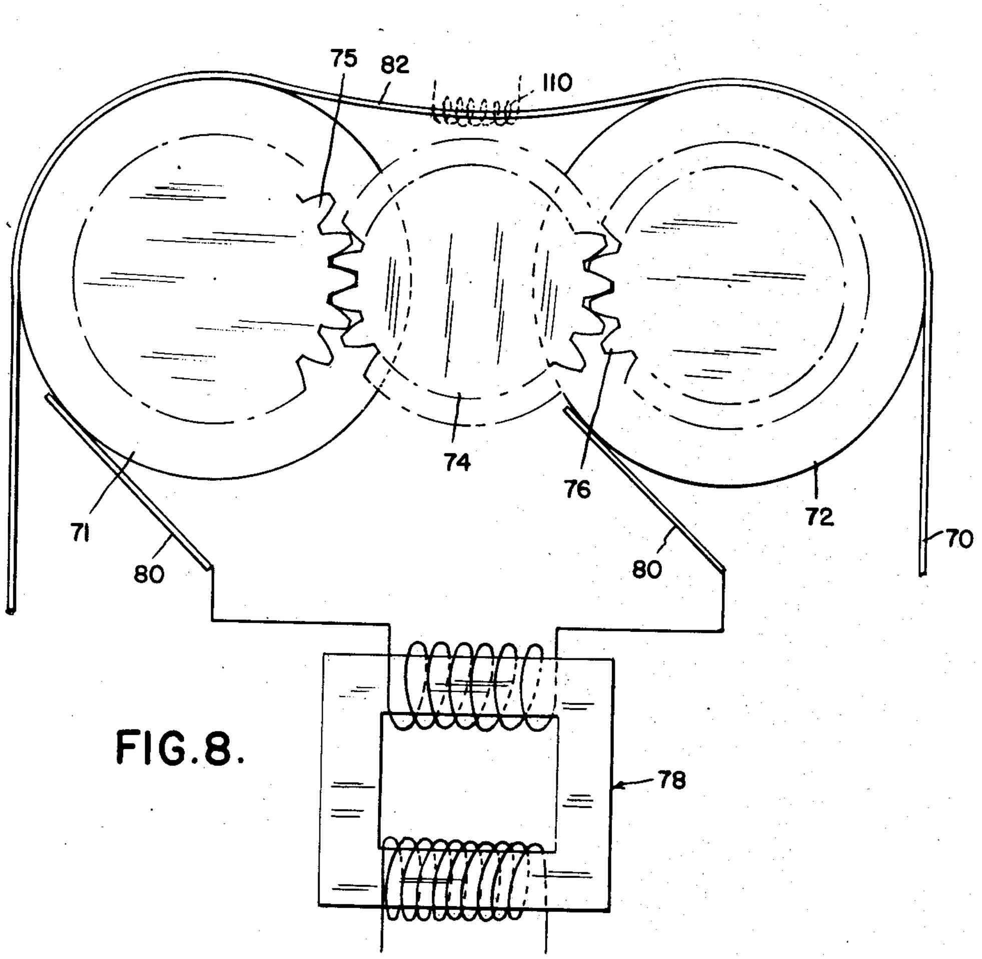
Figure 8 is a diagrammatic view illustrating apparatus for demagnetizing a record element.

In Figure 8 there is illustrated a device for effecting complete erasure of a prior recording from the record element by subjecting it to heat. In this figure a section of a record element 70 is indicated as led over a pair of pulleys 71 and 72. Pulleys may be formed of conducting material or if preferred, they may be of insulating material and merely provided with a conducting rim portion in contact with the record element 70. Inasmuch as the record element 70 is intended to be heated to a dull red heat and accordingly is softened, it is essential that the pulleys 71 and 72 be rotated with an identical peripheral speed. For this purpose an intermediate driving gear 74 is provided which meshes with conjugate gears 75 and 76 carried respectively by the pulleys 71 and 72.

A current source indicated generally at 78 is provided and is connected by means of brushes 80 which contact the peripheries of the pulleys 71 and 72. The conducting peripheries of the pulleys 71 and 72 are insulated from each other, either by virtue of insulating material in the pulleys themselves, or by forming the intermediate gear 74 of insulating material in the event that the pulleys 71 and 72 and gears 75 and 76 are formed of conducting material. Accordingly, current flow is through the portion 82 of the record element 70 which is intermediate pulleys 75 and 76, and this flow of current heats the section 82 to a dull red heat. This type of erasure is most efficient and will find its greatest utility where permanent recordings are made at a central studio.

Instead of heating the portion of the record element intermediate the pulleys 71 and 72 by conduction, an equivalent result could of course be obtained by heating this portion of the element by other means. Thus for example, an induction heating coil as indicated at 110 in dotted lines in Figure 8 could be provided through which the record element could be led. In this case as in that previously described, it is important that the rollers or pulleys 71 and 72 have identical peripheral speed inasmuch as the record element will be heated to a point where differential pulley speed could cause undesirable drawing or elongation of the element.

Figure 9:
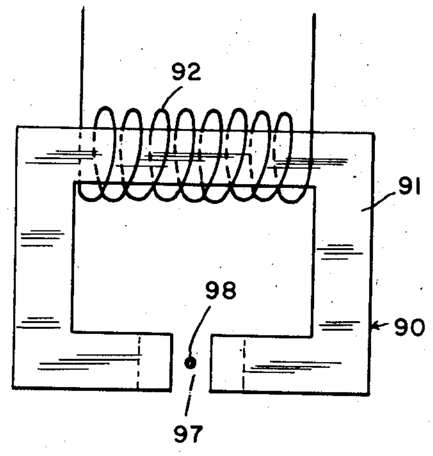
Figure 9 is a side elevation of a modified apparatus for demagnetizing a record element.
Figures 10, 11:
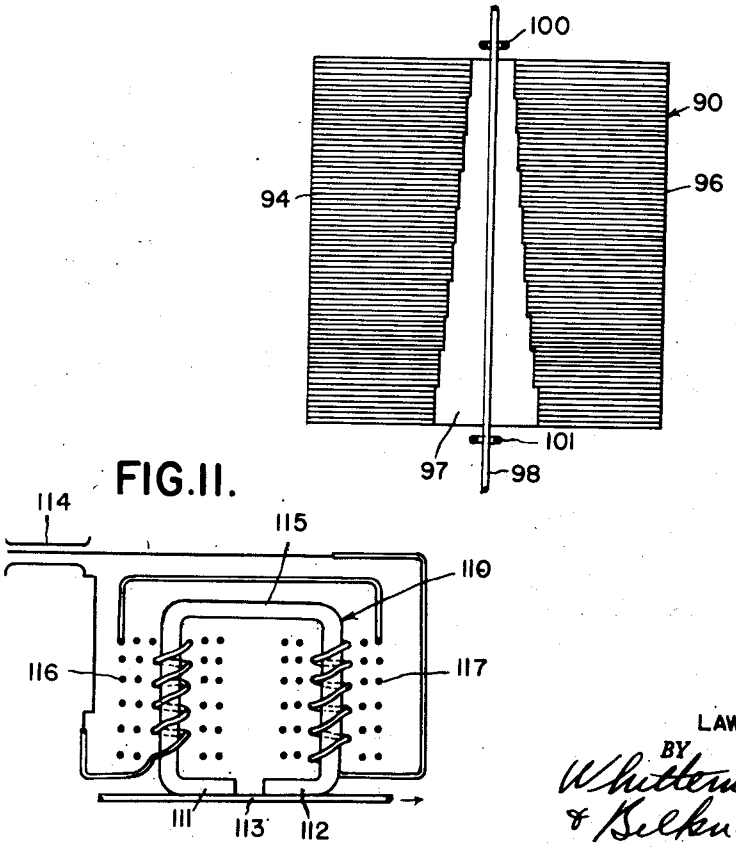
Figure 10 is a bottom plan view of the apparatus shown in Figure 9.
Figure 11 is a diagrammatic view illustrating a pick-up or reproducing head constructed in accordance with the present invention.

In this case the quality of erasure is more important than the additional expense which may be entailed by this type of erasure.

Where the quality of erasure is of less importance the apparatus illustrated in Figures 9 and 10 may be employed. This system of erasure depends upon subjecting the record element progressively to a relatively strong alternating field and gradually decreasing the strength of the field until it is of such strength as to supply only the coercive force of the particular record element being erased. With the apparatus illustrated in Figures 9 and 10 excellent results are obtained when ordinary 60 cycle alternating current is employed. As seen in these figures an electromagnet 90 is provided having a core 91 provided with a winding 92 connected to a source of 60 cycle alternating current. Preferably the core 91 is laminated as best seen in Figure 10 and is arranged so that the poles 94 and 96 define therebetween a gap 97 which is of stepped cross section so as to produce a field of diminishing intensity in the direction of travel of the record element 98. Desirably the width of the gap at its narrowest point is only sufficient to permit passage of the record element 98 without contact with either pole face. If desired, suitable guides indicated generally at 100, 101 may be employed to keep the section of the record element 98 intermediate poles 94 and 96 out of contact therewith.

The rate of advance of the record element is predetermined in accordance with the dimensions of the pole face so that each element of the wire is subjected to a full wave of magnetic field as it traverses each step of the gap. Furthermore, the current supplied to the windings 92 is such that the peak strength of the magnetic field at the widest portion of the gap is adapted to supply a magnetizing force substantially equal to the coercive force of the particular record element, and further that the rate of advance of the record element is such that each portion thereof is subjected to this.

With this type of recording it is impossible to remove all trace of magnetism. However, the undesirable effects of residual magnetism may be substantially minimized by applying the demagnetizing or erasing field in a direction perpendicular to the direction of the field which magnetizes the wire or record element during subsequent recording. Accordingly, since the present invention is primarily concerned with so-called axial recording and reproducing, the arrangement illustrated in Figures 9 and 10 is calculated to produce the most desirable results. In this case as will be readily apparent the demagnetizing or erasing field is transverse to the record element and hence is at substantially 90 degrees to the direction of the magnetic field employed in recording.

Referring now to Figure 11 there is illustrated a reproducing head which comprises a magnet 110 having an approaching pole 111 and a departing pole 112 in contact with an elongated record element 113. Passage of the record element 113 past the magnet poles 111 and 112 induces a current in the magnet windings which are connected to a suitable reproducing and amplifying circuit, preferably through the noninductive leads indicated at 114. The core 115 is preferably a single, fairly large cross sectional strip of Mumetal. This good magnetic circuit makes the head very susceptible to stray magnetic fields. It is imperative that a stray line of flux perpendicular to the central axis of the head intercept identical and opposite portions of coil. Multi-layer coils 116 and 117 are therefore made starting one winding at the left hand edge of the coil form 116 and the other at the right hand edge of the coil form 117. The inside windings are brought out as terminals and the outside windings connected together as clearly shown in the figure.

From the standpoint of obtaining uniformity of flux density across the width of a magnet pole, it is recognized that some advantage may reside in using an oriented material such as oriented silicon steel, with the direction of preferential magnetization perpendicular to the pole face. Alternatively, a laminated pole, having very thin laminae of alternated magnetic and nonmagnetic material may be employed, in which the laminae are presented perpendicular to the direction of advance of the record element. While two methods of recording have been mentioned, namely recording with supersonic bias, and recording with either direct current bias or additive coercive force, and while two specifically different types of recording heads have been illustrated, it is the provision of narrow width magnet pole or poles which is responsible for the improved results obtained with both systems of recording.

The drawings and the foregoing specification constitute a description of the improved apparatus for magnetic recording and reproduction in such full, clear, concise and exact terms as to enable any person skilled in the art to practice the invention, the scope of which is indicated by the appended claims.

What I claim as my invention is:

1. A magnetic recording head for magnetizing an elongated record element of permanent magnet material which comprises a pair of poles spaced apart longitudinally of the direction of travel of the record element and having surfaces for running engagement therewith, the approaching pole being a flat strip disposed to present a side surface for extended contact therealong with the record element and an end surface at the gap, the departing pole being a thin flat strip disposed to present an end surface for limited contact cross-wise thereof with the record element and a side surface at the gap.

2. A magnetic recording head for magnetizing an elongated record element of permanent magnet material which comprises a pair of poles spaced apart longitudinally of the direction of travel of the record element and having surfaces for running engagement therewith, the approaching pole being a flat strip disposed to present a side surface for extended contact therealong with the record element and an end surface at the gap, the departing pole being a thin flat strip disposed to present an end surface for limited contact cross-wise thereof with the record element and a side surface at the gap, the end surface of said departing pole being notched to receive a recording element of circular cross-section.

3. A magnetic recording head for magnetizing an elongated record element of permanent magnet material which comprises a support body having a slot therethrough opening into the front surface thereof, an approaching pole comprising a strip of magnetic material disposed along said surface and having an end located adjacent one side of said slot, a departing pole comprising a second strip of magnetic material disposed in said slot and having an end surface exposed at the front surface of said body for contact with the record element, said poles being spaced apart to define a gap therebetween.

4. A magnetic recording head for magnetizing an elongated record element of permanent magnet material which comprises a support body having a slot therethrough opening into the front surface thereof, an approaching pole comprising a strip of magnetic material disposed along said surface and having an end located adjacent one side of said slot, a departing pole comprising a second strip of magnetic material disposed in said slot and having an end surface exposed at the front surface of said body for contact with the record element, said poles being spaced apart to define a gap therebetween, a core having ends shaped to engage portions of said poles remote from said gap, and releasable clamping means for connecting the ends of said core to said poles.

5. A magnetic recording head for magnetizing an elongated record element of permanent magnet material which comprises a pair of poles spaced apart longitudinally of the direction of travel of the record element and having surfaces for running engagement therewith, said poles comprising flat strips of magnetic material disposed substantially at right angles to each other with the side surface of one strip adjacent the end thereof being substantially parallel to and spaced from the end surface of the other strip, and the end surface of said one strip being coplanar with a side surface adjacent the end of said other strip.

LAWRENCE H. CONNELL.

References Cited in the file of this patent

UNITED STATES PATENTS

| Number | Name | Date |
|---|---|---|
| 1,142,384 | Tiffany | June 5, 1915 |
| 1,828,190 | Kiliani | Oct. 20, 1931 |
| 1,837,586 | Rhodehamel | Dec. 22, 1931 |
| 2,144,844 | Hickman | Jan. 24, 1939 |
| 2,185,300 | Hickman | Jan. 2, 1940 |
| 2,210,770 | Muller-Ernesti | Aug. 6, 1940 |
| 2,277,305 | Clapton | Mar. 24, 1942 |
| 2,281,793 | Patrick | May 5, 1942 |
| 2,288,862 | Weitmann | July 7, 1942 |
| 2,428,002 | Barrett | Sept. 30, 1947 |
| 2,428,701 | Ellenberger | Oct. 7, 1947 |
| 2,429,792 | Begun | Oct. 28, 1947 |
| 2,432,162 | Jones | Dec. 9, 1947 |
| 2,469,444 | Roys | May 10, 1949 |
| 2,483,123 | Clapp | Sept. 27, 1949 |
| 2,514,577 | Heller | July 11, 1950 |
| 2,523,515 | Porter | Sept. 26, 1950 |
| 2,523,576 | Kornei | Sept. 26, 1950 |
| 2,553,290 | Bachman | May 15, 1951 |

FOREIGN PATENTS

| Number | Country | Date |
|---|---|---|
| 617,796 | Germany | Aug. 28, 1935 |
| 725,830 | Germany | Sept. 30, 1942 |
| 881,343 | France | Apr. 21, 1943 |